(12) United States Patent
Kwatra et al.

(10) Patent No.: US 10,841,663 B2
(45) Date of Patent: Nov. 17, 2020

(54) METHODS AND SYSTEMS FOR MANAGING CONTENT ON MULTIPLE DEVICES

(71) Applicant: INTERNATIONAL BUSINESS MACHINES CORPORATION, Armonk, NY (US)

(72) Inventors: Shikhar Kwatra, Durham, NC (US); Jeremy R. Fox, Georgetown, TX (US); Sarbajit K. Rakshit, Kolkata (IN); Maharaj Mukherjee, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/115,088

(22) Filed: Aug. 28, 2018

(65) Prior Publication Data

US 2020/0077156 A1 Mar. 5, 2020

(51) Int. Cl.
*H04N 21/81* (2011.01)
*H04N 21/41* (2011.01)
*H04N 21/45* (2011.01)
*G06N 20/00* (2019.01)
*G06Q 30/02* (2012.01)

(52) U.S. Cl.
CPC ......... *H04N 21/8133* (2013.01); *G06N 20/00* (2019.01); *H04N 21/4126* (2013.01); *H04N 21/4524* (2013.01); *H04N 21/4532* (2013.01); *G06Q 30/0251* (2013.01)

(58) Field of Classification Search
CPC .......... H04N 21/8133; H04N 21/4126; H04N 21/4532; H04N 21/4524
See application file for complete search history.

(56) References Cited

U.S. PATENT DOCUMENTS

| 8,966,525 | B2 | 2/2015 | Mehta et al. |
| 9,706,255 | B2 | 7/2017 | Xu et al. |
| 9,866,916 | B1* | 1/2018 | Boss .................. H04N 21/4852 |
| 2013/0036011 | A1 | 2/2013 | Roberts et al. |
| 2014/0074621 | A1* | 3/2014 | Chai .................. G06Q 30/0251 |
| | | | 705/14.66 |

* cited by examiner

*Primary Examiner* — Yassin Alata
(74) *Attorney, Agent, or Firm* — Griffiths & Seaton PLLC

(57) ABSTRACT

Embodiments for managing content by one or more processors are described. A rendering of a first content portion by a first computing node is detected. A second content portion is received. The second content portion is associated with the first content portion. A second computing node is selected based on at least one of a location of the second computing node, an activity of an individual, and the second content portion. The second content portion is caused to be rendered by the second computing node.

21 Claims, 6 Drawing Sheets

METHODS AND SYSTEMS FOR MANAGING CONTENT ON MULTIPLE DEVICES

BACKGROUND OF THE INVENTION

Field of the Invention

The present invention relates in general to computing systems, and more particularly, to various embodiments for managing content on multiple devices.

Description of the Related Art

In recent years, computing devices, such as mobile electronic devices (e.g., cellular/mobile/smartphones, personal digital assistants (PDAs), and tablets, etc.), have become widely used to the point that many people now have such a device with them at all times. These devices are able to assist users in a multitude of ways in their daily lives, such as internet access, scheduling, entertainment, and particularly communication.

However, different computing devices, or types of computing devices, are often used for different purposes and/or for rendering different types of content. For example, mobile phones are often used for communication purposes (e.g., phone calls, text messaging, etc.) and web browsing, while devices with larger screens, such as televisions and desktops, are often preferably used for rendering content more suitable or enjoyable on larger screens, such as videos, and wearable devices, such as smart watches, are often used for checking time and collecting biometric data. It is often difficult to know what types of content are the most likely to be consumed (e.g., viewed, listened to, interacted with, etc.) on the various types of devices.

SUMMARY OF THE INVENTION

Various embodiments for managing content by one or more processors are described. In one embodiment, by way of example only, a method for managing content, again by one or more processors, is provided. A rendering of a first content portion by a first computing node is detected. A second content portion is received. The second content portion is associated with the first content portion. A second computing node is selected based on at least one of a location of the second computing node, an activity of an individual, and the second content portion. The second content portion is caused to be rendered by the second computing node.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
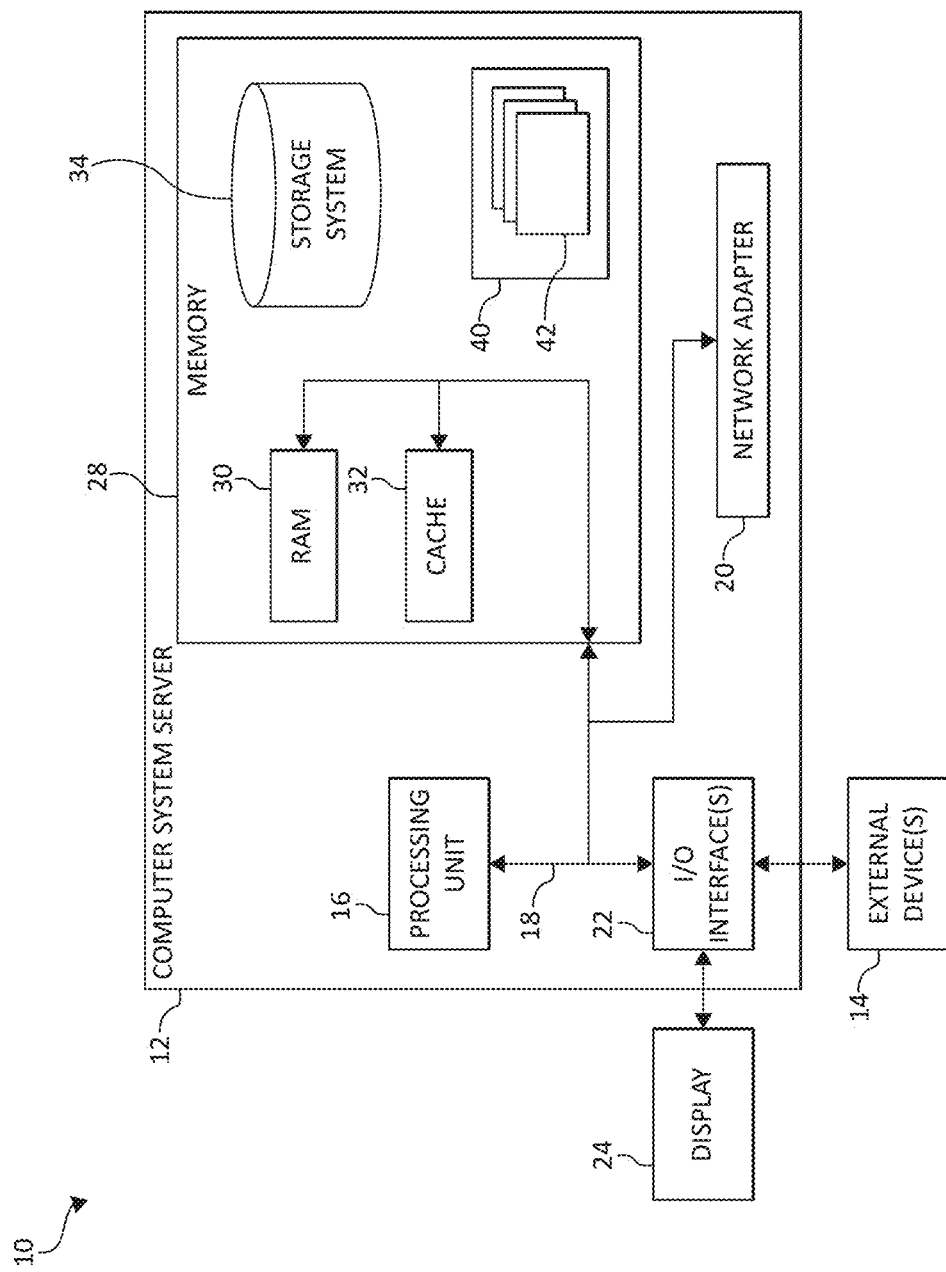
FIG. 1 is a block diagram depicting an exemplary computing node according to an embodiment of the present invention.

As discussed above, computing devices, such as mobile electronic devices (e.g., cellular/mobile/smart phones, personal digital assistants (PDAs), and tablets, etc.), are now widely used to the point that many people now have such a device with them at all times. These devices are able to assist users in a multitude of ways in their daily lives, such as internet access, scheduling, entertainment, and particularly communication.

However, different computing devices, or types of computing devices, are often to for different purposes and/or for rendering different types of content. For example, mobile phones are often used for communication purposes (e.g., phone calls, text messaging, etc.) and web browsing, while devices with larger screens, such as televisions and desktops, are often preferably used for rendering content more suitable or enjoyable on larger screens, such as videos and wearable devices, such as smart watches, are often used for checking time and collecting biometric data.

It is often difficult to know what types of content are the most likely to be consumed (e.g., viewed, listened to, interacted with, etc.) on the various types of devices. For example, if a user is watching an advertisement (e.g., a commercial) on a television (e.g., a "smart" television), and there is a desire promote the product or service associated with the advertisement to the maximum extent possible, it may be beneficial send contact information, such as a phone number and/or email address, to a computing device (e.g., besides the television) so that he/she may easily contact the respective organization. However, if the user has multiple other devices, such as a mobile phone, a tablet, a laptop, and a wearable device (e.g., a smart watch), it may be difficult to ascertain which device will be the most effective in this regard. At the same time, if contact information is sent to all of the devices, the user may become annoyed and ignore all such prompts.

To address these needs, some embodiments described herein provide methods and systems for managing content based on, for example, an understanding (e.g., via a cognitive analysis) of different types of content, potential user devices (or computing nodes) that may be used to consume the content, the user's dynamic preferences (e.g., via an implicit and/or explicit learning/feedback mechanism), and a contextual situation regarding the content and/or the user. Using the methods and systems described herein, content (and/or particular portions or types of content) may be automatically rendered on particular user devices such that the probability of the user consuming and/or interacting with the content is maximized.

It should be understood that as used herein, the term "computing node" (or simply "node") may refer to a computing device, such as a mobile electronic device or a desktop computer, and/or an application, such an email application, social media application, a web browser, etc. In other words, as used herein, examples of computing nodes include, for example, computing devices such as mobile phones, tablet devices, desktop computers, or workstations that are owned and/or otherwise associated with individuals (or users), and/or various applications that are utilized by the individuals on such computing devices.

In some embodiments, previous utilization of various devices (or computing nodes) by the user (or users) is used to distribute content portions (or segments) to different devices, such as when the user is in a multi-device environment. For example, assume a user is watching a video advertisement or commercial (i.e., a primary content portion) on a (smart) television, which includes contact information (i.e., a secondary content portion), such as phone number, email address, etc., for the company associated with the advertisement. If the system determines that a mobile device (or other computing device besides the television) associated with the user is nearby (or near the user), the contact information may be (automatically) sent to the mobile phone so that the user may easily contact the organization and/or save the information for later use, while the remainder of the advertisement is shown on the television. Such a functionality may be at least in part based on previous activity of the user (e.g., the user has previously used contact information sent in such a way to contact the respective organization).

In some embodiments, the system determines which (if any) devices are currently being used by and/or in close proximity to the user to identify which device(s) is the "best" device for rendering the content or content portion(s) (e.g., which device will most likely result in the content being consumed/interacted with by the user). For example, assume the user is sitting in front of a television while a commercial is being rendered, and the system determines that no other devices are relatively close to the user (e.g., within 3 meters, in the same room, etc.). In such an instance, the content may only be rendered on the television and no content or content portions may be sent to any other devices. However, if the system determines that the user has their laptop computer nearby (e.g., on their lap), a content portion (e.g., contact information) may be sent to and rendered by the laptop.

As another example, if a television program or commercial is showing various exercises or exercise equipment along with associated biometric data, and it is determined that the user is wearing a smart watch, the biometric data from the television content may be sent to the user's smart watch (e.g., so that they may compare it to similar biometric data of their own). However, if the user is not carrying/wearing their smart watch (and/or they don't own one), the biometric information may be sent to another device that is determined to be nearby, such as a mobile phone.

In some embodiments, the system monitors and/or analyzes the contextual situation of the user to identify how specific content (or content portions) are best distributed to different devices and/or different types of devices. The contextual situation, perhaps along with feedback from the user, may be considered, as may the user's level of comfort and accessibility with various devices, the confidentiality (or sensitivity) of content, the changes of consuming the content on various devices, and/or the being used by or in close proximity with the user at a given time.

For example, if the user is watching a commercial on a television while a mobile phone is in their pocket, and they are wearing a smart watch, it may be determined that the user is more likely to view the smart watch than take the mobile phone out of their pocket. As such, the content may be sent to the smart watch rather than the mobile phone. However, if the systems determines that the type of content is more suitably rendered with a larger display device (e.g., an image or video), the content may be sent to the mobile phone and/or simply continue to be rendered on the television (i.e., not sent to another other device).

Also, in some embodiments, facial/emotion or gaze recognition (e.g., via a camera or other sensor integrated within one of the computing devices described below) may be utilized to determine a user's interest in particular content. For example, if it is determined that the user's gaze is fixed towards the television during the commercial, such may be utilized to initiate content portion(s) being sent to another device, such as a mobile phone.

In some embodiments, user preferences (or settings) may (also) be utilized. For example, if multiple individuals are simultaneously watching a commercial on the same television, content portions (e.g., contact information) may be sent to respective devices associated with the individuals, based on their personal preferences (e.g., preferred devices, whether or not to receive associated content at all, etc.).

In some embodiments, a cognitive analysis may be used to generate a profile for the user(s), analyze the content portions, and/or select a computing device to which to send/have render a (secondary) content piece. Data sources that be use used to generate a cognitive profile for the user(s) may include any appropriate data sources associated with the user that are accessible by the system (perhaps with the permission or authorization of the user). Examples of such data sources include, but are not limited to, a profile of (or basic information about) the user (e.g., job title, place of work, length of time at current position, family role, etc.), a schedule or calendar (i.e., the items listed thereon, time frames, etc.), projects (e.g., past, current, or future work-related projects), electronic communications (e.g., email, text messages, etc.), social media activity (e.g., posts, reactions, comments, groups, etc.), browsing history (e.g., web pages visited), and online purchases.

The cognitive analysis may include classifying natural language, analyzing tone, and analyzing sentiment (e.g., scanning for keywords, key phrases, etc.) with respect to, for example, the data sources associated with the user(s) and/or content portions. Over time, the methods and systems described herein may determine correlations (or insights) that allow for an improvement in the determining of the relevancy or importance of topics and/or comments for users, perhaps with feedback provided by the users, that allows for the performance of the system to improve with continued use.

As such, in some embodiments, the methods and/or systems described herein may utilize a "cognitive analysis," "cognitive system," "machine learning," "cognitive modeling," "predictive analytics," and/or "data analytics," as is commonly understood by one skilled in the art. Generally, these processes may include, for example, receiving and/or retrieving multiple sets of inputs, and the associated outputs, of one or more systems and processing the data (e.g., using a computing system and/or processor) to generate or extract models, rules, etc. that correspond to, govern, and/or estimate the operation of the system(s), or with respect to the embodiments described herein, the rendering of content portions by or on selected computing devices or nodes. Utilizing the models, the performance (or operation) of the system (e.g., utilizing/based on new inputs) may be predicted and/or the performance of the system may be optimized by investigating how changes in the input(s) effect the output(s).

In particular, in some embodiments, a method for managing content, again by one or more processors, is provided. A rendering of a first content portion by a first computing node is detected. A second content portion is received. The second content portion is associated with the first content portion. A second computing node is selected based on at least one of a location of the second computing node, an activity of an individual, and the second content portion. The second content portion is caused to be rendered by the second computing node.

The selecting of the second computing node may include selecting the second computing node from a plurality of computing nodes associated with the individual. The selecting of the second computing node may be performed utilizing a cognitive analysis.

If the selecting of the second computing node is based on at least the activity of the individual, the activity of the individual may include at least one of a current activity of the individual during the receiving of the second content portion or a previous activity of the individual associated with previous content portions. The first content portion may include information, and the second content portion includes at least some of the information.

The first computing node may include a first type of computing device, and the second computing node may includes a second type of computing device. The second type of computing device being different than the first type of computing device. The second computing node may include a mobile electronic device.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment, such as cellular networks, now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 (and/or one or more processors described herein) is capable of being implemented and/or performing (or causing or enabling) any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

In the context of the present invention, and as one of skill in the art will appreciate, various components depicted in FIG. 1 may be located in, for example, personal computer systems, server computer systems, thin clients, thick clients, hand-held or laptop devices, multiprocessor systems, microprocessor-based systems, set top boxes, programmable consumer electronics, network PCs, mobile electronic devices such as mobile (or cellular and/or smart) phones, personal data assistants (PDAs), tablets, wearable technology devices, laptops, handheld game consoles, portable media players, etc., as well as computing systems in vehicles, such as automobiles, aircraft, watercrafts, etc. However, in some embodiments, some of the components depicted in FIG. 1 may be located in a computing device in, for example, a satellite, such as a Global Position System (GPS) satellite. For example, some of the processing and data storage capabilities associated with mechanisms of the illustrated embodiments may take place locally via local processing components, while the same components are connected via a network to remotely located, distributed computing data processing and storage components to accomplish various purposes of the present invention. Again, as will be appreciated by one of ordinary skill in the art, the present illustration is intended to convey only a subset of what may be an entire connected network of distributed computing components that accomplish various inventive aspects collectively.

Figure 2:
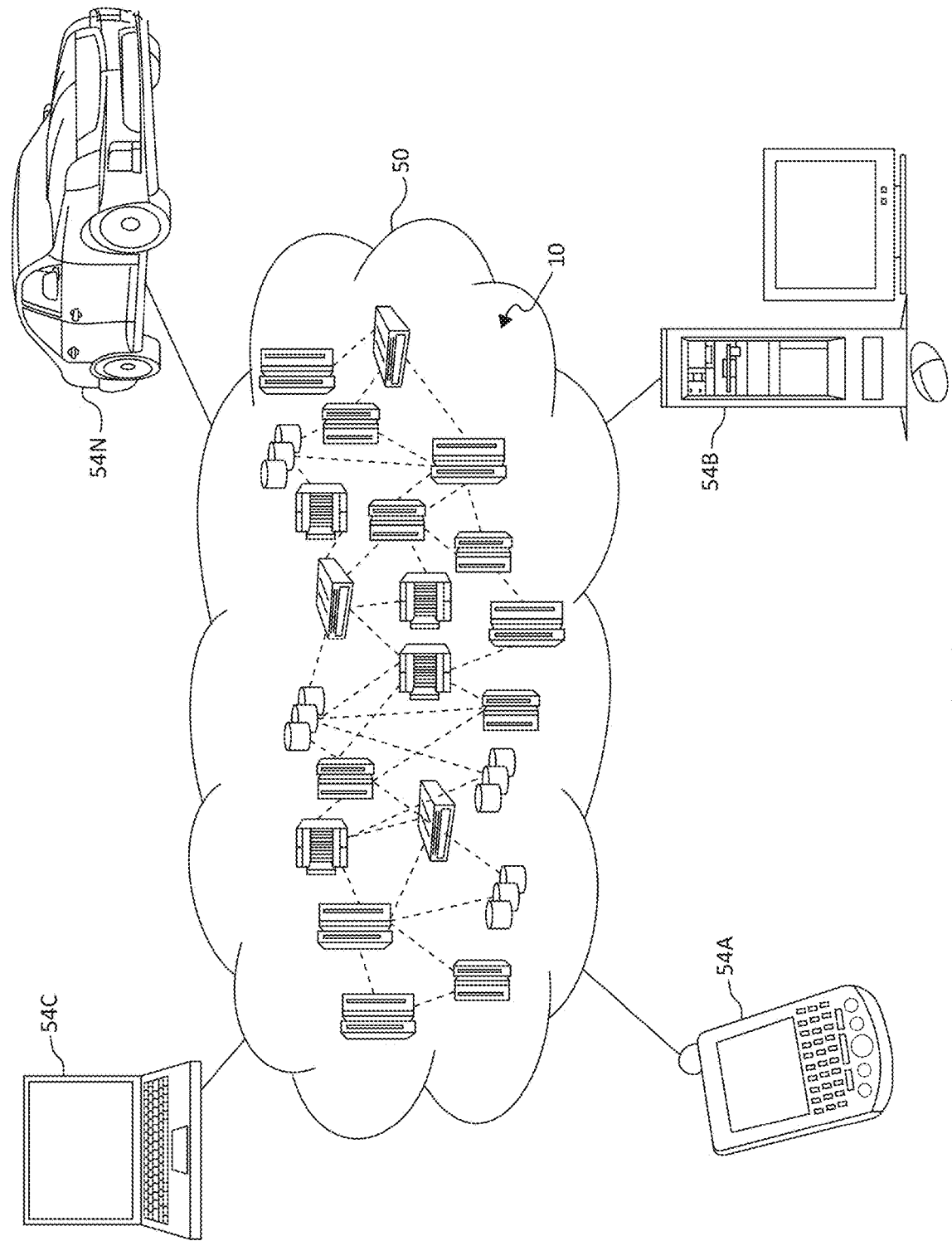
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, cellular telephone or PDA 54A, desktop computer 54B, laptop computer 54C, and vehicular computing system (e.g., integrated within automobiles, aircraft, watercraft, etc.) 54N, may communicate.

Still referring to FIG. 2, nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
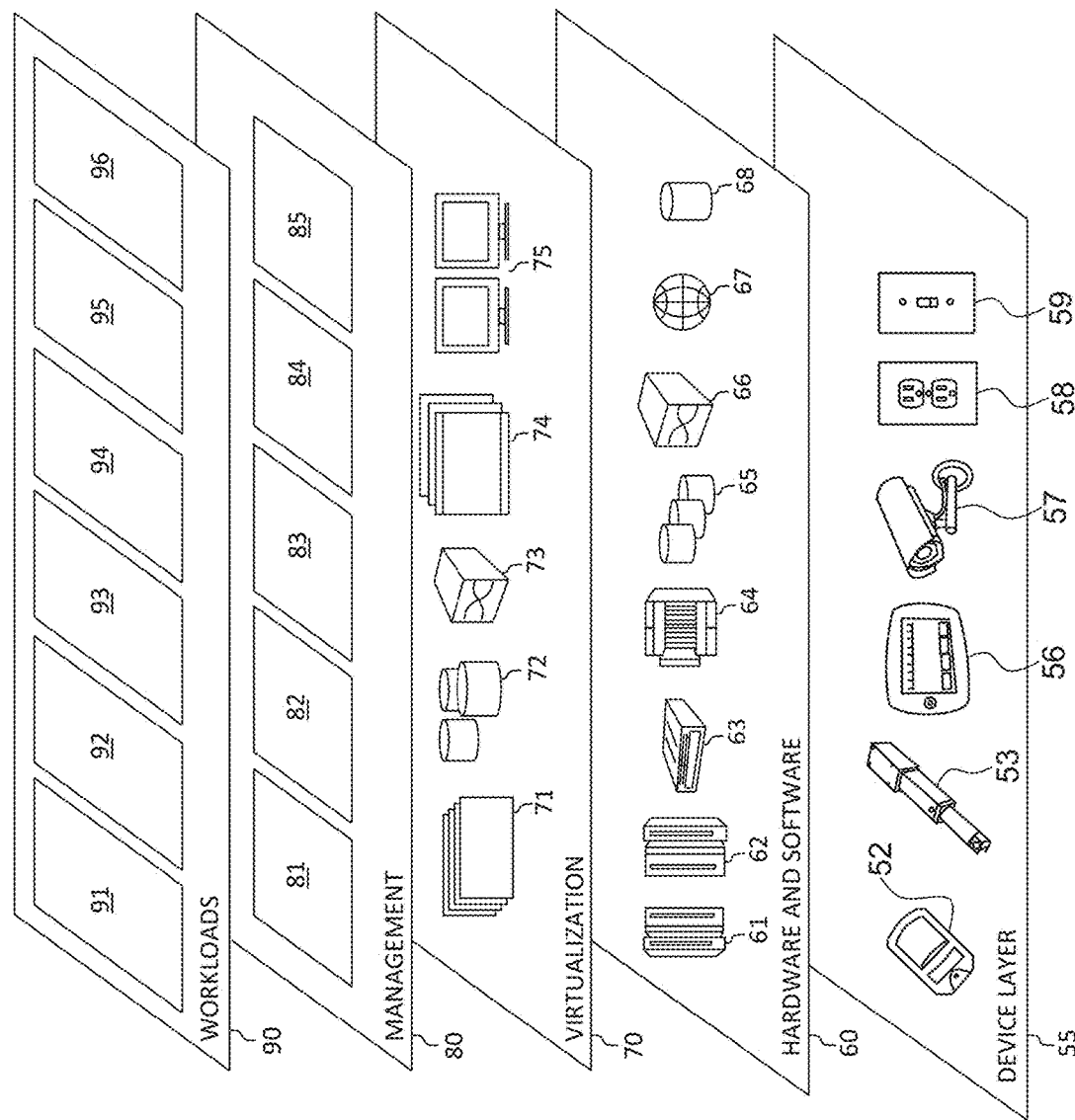
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to, various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for managing content as described herein. One of ordinary skill in the art will appreciate that the workloads and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously mentioned, some embodiments described herein provide methods and systems for managing content based on, for example, an understanding (e.g., via a cognitive analysis) of different types of content, potential user devices (or computing nodes) that may be used to consume the content, the user's dynamic preferences (e.g., via an implicit and/or explicit learning/feedback mechanism), and a contextual situation regarding the content and/or the user. Using the methods and systems described herein, content (and/or particular portions or types of content) may be automatically rendered on particular devices such that the probability of the user consuming and/or interacting with the content is maximized.

In some embodiments, the user's previous activity with respect to content viewing (or interaction) on the user's devices is tracked (or monitored and/or stored). The information may be used to develop a relationship between the user's consumption of content on different devices and/or different types of devices, which may be used to select devices for the distribution of future content portions (e.g., via the development of a "rigidity factor" and/or to train a cognitive model/profile). The devices (and/or a central system/server) may also track additional information about device usage and content capabilities, contextual surroundings, proximity of devices, content portion consumption/interaction, etc. As such, the historical usage of different devices, content viewing pattern, the relationship(s) between the content viewed in different devices, and surrounding contexts may be monitored, and using machine learning techniques, the system may create a history of device usage and content viewing in various situations and/or for various types of content.

In some embodiments, at least some of the devices associated with the user(s) may be able to communicate to determine the proximity of devices to each other and/or the proximity or accessibility of the devices to the user (e.g., via wireless communications, GPS, etc.). When a content portion is being rendered on one device (e.g., a television), the system may determine if any other devices (e.g., a mobile phone, tablet, etc.) are within a predetermined range of the primary device (e.g., the television) and/or the user.

In some embodiments, the relationship(s) between content consumed on different devices is also tracked or monitored. For example, if the user views a commercial on television, and then used their mobile device (e.g., a mobile phone) to find contact information for the organization online, such information may be stored.

In some embodiments, the content portions are "tagged" (e.g., have associated metadata) by, for example, an organization associated with the content (e.g., a content service provider). The tags may be used to categorize and/or identify the type of content (e.g., email address, phone number, physical address, biometric data, etc.).

In some embodiments, the different devices (e.g., via communicating with each other) associated with a user and/or a central server determine what types of content portions may be (and/or are suitably) rendered by the different devices and analyze the surrounding context (e.g., the type of content, which devices are near the user, etc.). When a primary (or first) content portion is rendered on a first device, the user's affinity (or likelihood) of viewing or consuming related (or second) content portions on other devices may be predicted. When the primary content portion is rendered on the first device, the second device may (also) be selected based on the contextual surroundings.

In some embodiments, the selection of the (second) computing device or node may be at least in part based on geographic location or an activity of the user (e.g., previous activity or current activity). The location or activity of the user may be used to determine (or select) a preferred device (e.g., via user settings).

For example, the user may select to have the content portion(s) rendered by specific devices when the user is in particular locations (e.g., geo-fence driven priority). As a few specific examples, the user may select to give their smart watch priority when the user is in their kitchen, the user may choose to give their hands-free digital assistant priority when the user is in the shower, and/or the user may choose to give their mobile phone priority when they are at their workplace (e.g., at their desk).

Alternatively, the user may select to have the content portion(s) rendered by specific devices when the user is performing particular tasks or undergoing particular activities. For example, the user may select to give their smart watch priority when they are exercising (e.g., as determined by a wearable device), regardless of their location (e.g., at a gym, at home, at work, etc.). Similarly, the user may select to give their tablet device priority when on an airplane (e.g., regardless of location), or the user may select to give their mobile phone priority when in an automobile.

In some embodiments, the system may be able to learn the order in which devices are often used by the user. For example, the user may often use their mobile phone to take a photograph, upload it to a cloud drive, and then user a device with a larger screen (e.g., tablet or laptop) to edit the photograph. In such an instance, over time, the system may learn to automatically send the photograph to the second device (and perhaps open the photograph with the appropriate application), perhaps after automatically saving the photograph to the cloud drive.

In some embodiments, the system may adjust the rendering of content portions for multiple users who use the same device based on, for example, the order of usage of other personal devices. For example, if more than one user frequently utilizes the same laptop to view or interact with content related to a television commercial after the commercial is rendered by a particular television, but one of the users typically utilizes the laptop for that purpose immediately after the commercial, while the other user(s) typically utilizes other devices first, the system may customize the rendering of the content on the laptop for that particular user after the commercial is rendered.

Figure 4:
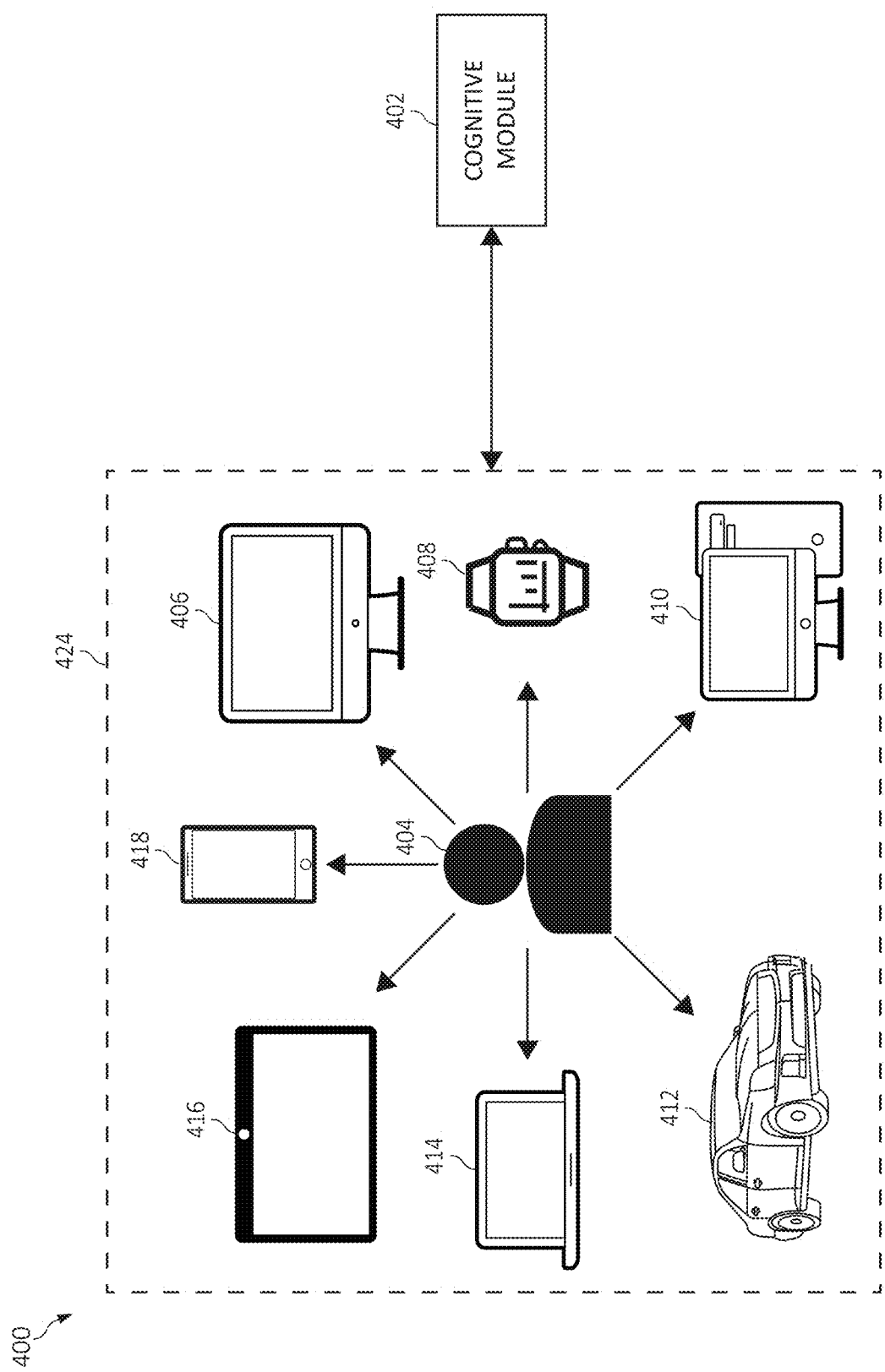
FIG. 4 is a block diagram example computing environment according to an embodiment of the present invention.

FIG. 4 illustrates an exemplary computing environment (or system) 400 according to some embodiments of the present invention. The computing environment includes a cognitive module (or more generally, a computing system) 402 and a plurality of computing devices (or nodes) that are associated with (e.g., used by, registered to, etc.) a user (or users) 404. In the example shown, the computing devices include a television (e.g., a smart television) 406, a wearable device (e.g., a smart watch) 408, a desktop computer (or PC) 410, an automotive computing system 412, a laptop computer 414, a tablet device 416, and a mobile phone 418.

The cognitive module 402 may be implemented within any suitable computing device, such as those described above, and may be configured to perform at least some of the functionality described herein. For example, in some embodiments, the cognitive module 402 may monitor the positions/locations of the computing devices 406-418 (e.g., at least relative to each other and/or relative to the user 404), as well as the utilization and/or operation thereof (e.g., by the user 404). Additionally, the cognitive module 402 may monitor various types of content sent to and/or rendered by the computing devices 406-418, the user's consumption of and/or interaction with the content, and/or the distribution of the content (or content portions) as described herein.

Figure 5:
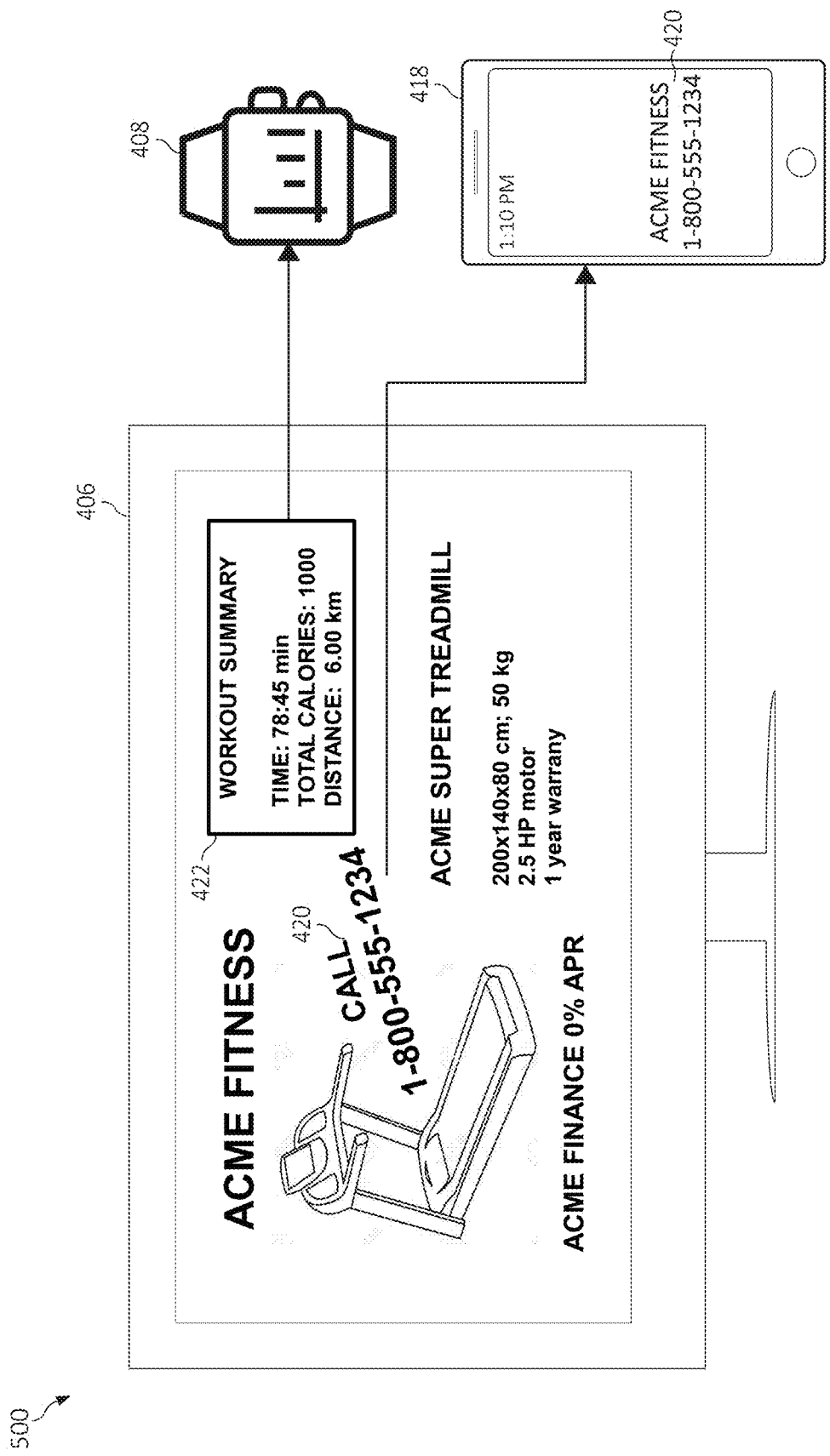
FIG. 5 is a plan view of several computing devices from the computing environment of FIG. 4.

Referring now to FIG. 5, the television 406, smart watch 408, and mobile phone 418 from FIG. 4 are illustrated. In particular, the television 406 is shown rendering a (first or primary) content portion, which in the example shown is a advertisement or commercial (e.g., associated with a product named "ACME Super Treadmill" made/sold by company named "ACME Fitness"). As such, in the example shown, the television 406 may be considered to be the "primary" computing device (i.e., the computing device rendering the first/primary content portion). Although a television commercial (e.g., a video) is used as the primary content portion in the example shown in FIG. 5, it should be understood that the methods and systems described herein may be applied to other types of content, such as audio files/streams, images, reading materials (e.g., text-based files), websites, etc.

In some embodiments, the system (e.g., the cognitive module 402 in FIG. 4) detects the rendering of the commercial on the television 406 (and/or causes the rendering thereof), and perhaps scans the content for information indicating that there is content associated with the commercial (e.g., by identifying tags, performing natural language processing on the content, etc.). In the example shown, the commercial includes contact information 420 (e.g., a phone number) and biometric information (e.g., related to the product being advertised) 422. In some embodiments, the contact information 420 and the biometric information 422 may be considered to be secondary (or second, third, etc.)

content portions. As such, in some embodiments, the secondary content portion(s) may be associated with the primary content portion (e.g., information related to the product described in the commercial). In some embodiments, the secondary content portion(s) are (at least in part) included within the primary content portion(s) and/or include information that is included within the primary content portion(s) (e.g., the contact information 420 and the biometric information 422 are included in the commercial).

In some embodiments, upon detecting (and/or receiving) the secondary content portion(s), the system selects a computing device (or node), more particularly a secondary (or second, third, etc.) computing device, to which to send and/or to render the secondary content portion(s). More specifically, the system selects at least one of the available computing devices besides the computing device that is rendering the primary content portion. In the example shown, the television 406 is rendering the primary content portion, and as such, the system may select from computing devices 408, 410, 412, 414, 416, and 418.

As described above, the selection of the secondary computing device may be based on, for example, on at least one of the positions/locations of the available computing devices, an activity (current or past activity) of the user 404, and the secondary content portion. In particular, the selection of the secondary computing device may be based on which, if any, of the computing devices, are within a predetermined range 424 (FIG. 4) (e.g., within a predetermined distance, in the same room, etc.) of the primary computing device (e.g., the television 406) and/or the user 404. The selection of the secondary computing device may (also) be based on user activity. For example, the user's 404 previous consumption of (or interaction with) secondary content portions on the available devices may be used, as may the current location of the user 404 (i.e., the user's location when the secondary content portion is received) and/or the current activity of the user 404 (e.g., exercising, any devices currently being used by the user, etc.). Additionally, the type and/or nature of and/or information (e.g., contact information, additional details about a product, website URL, etc.) contained within the secondary content portion may also be used (e.g., as determined by tags, language processing, etc.).

As described above, the selection of the secondary computing device may be performed using a cognitive analysis (e.g., with respect to the user 404, the available computing devices, and/or the secondary content portion(s)). In some embodiments, the selection of the secondary computing device may include determining (or calculating) a grade or score for each of the available computing devices. For example, each of the available computing devices may be assigned a descriptive grade, such as "best," "worst," etc. or a score may be calculated for each (e.g., on any suitable scale, positive or negative, etc.). After a (or at least one) secondary computing device is selected, a signal representative of the selection may be generated, which may then be used to cause the secondary content portion(s) to be transmitted (e.g., via wireless communication) to and/or rendered by the appropriate computing device(s).

Referring again to FIG. 5, in the depicted embodiment, the mobile phone 418 was selected as a secondary computing device. As described above, the mobile phone 418 may be selected because, for example, the system detected that the mobile phone 418 is within a predetermined proximity of the television 406 (and/or the user 404), and perhaps because of the type of information included in the secondary content pieces, in particular, the contact information 420. As such, the contact information 420 has (automatically) been sent to and rendered by the mobile phone 418. Thus, the user 404 is provided with an easy means to contact the company associated with the product in the commercial (e.g., by calling the phone number, saving the contact information 420 for later use, etc.). It should be noted that in the depicted embodiment the secondary content portion rendered by the mobile phone 418 corresponds to the type of device to which it is sent (e.g., a telephone number was sent to/rendered by a mobile phone).

In some embodiments, multiple secondary content portions may be sent to different secondary computing devices. In such embodiments, the selection of the secondary computing device(s) may be made with respect to each of the secondary content portions. For example, still referring to FIG. 5, the smart watch 408 has (also) been selected as a secondary computing device, and the biometric information 422 has been (automatically) sent to and, although not shown in detail, rendered by the smart watch 408. Thus, the user 404 is provided with an easy means to utilize the biometric information 422 (e.g., to compare it to their similar biometric information related to their current exercise routines, store for later use, etc.). Again, it should be noted that in such an embodiment the secondary content portion sent to/rendered by the secondary computing device corresponds to the type of computing device (e.g., biometric information was to a computing device used to collect biometric information).

Figure 6:
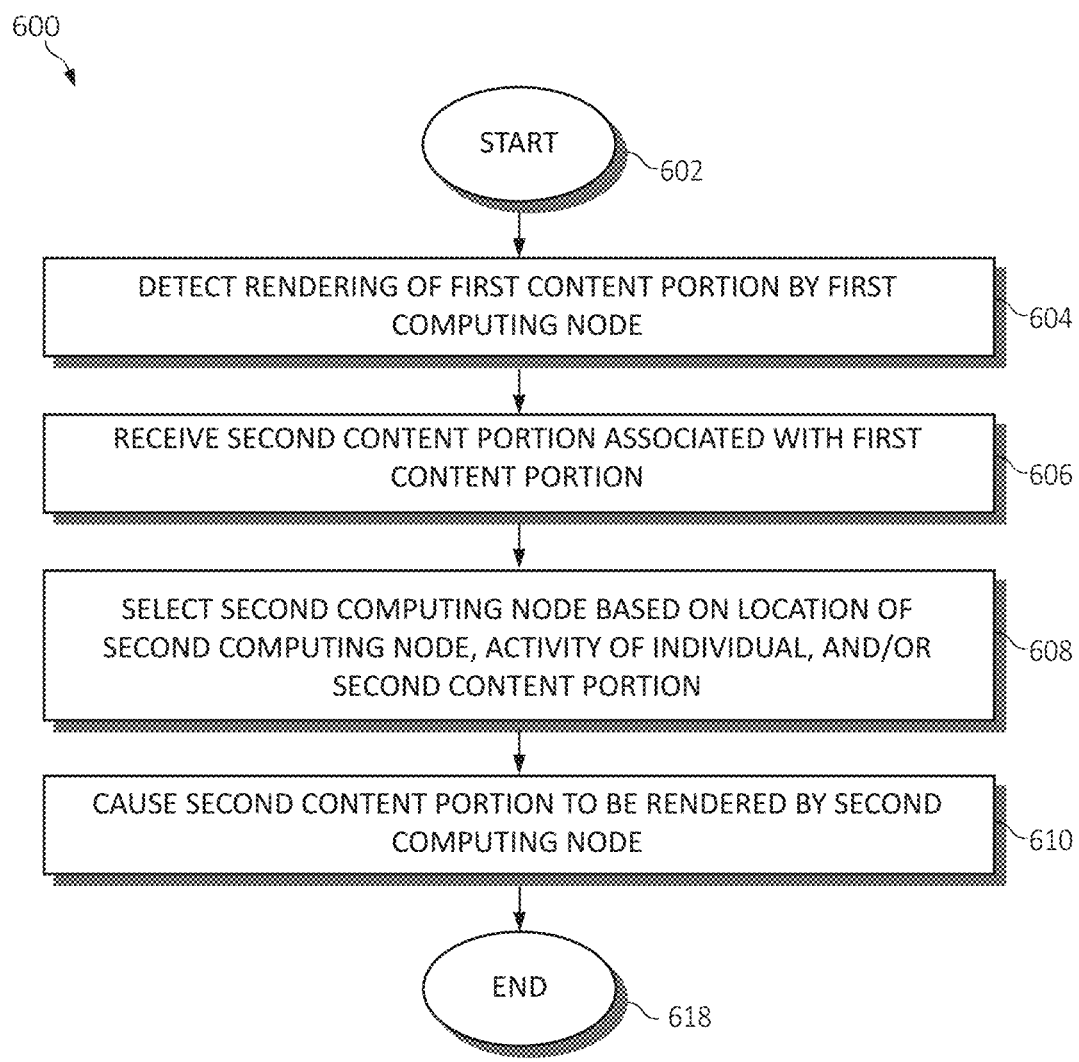
FIG. 6 is a flowchart diagram of an exemplary method for managing content according to an embodiment of the present invention.

Turning to FIG. 6, a flowchart diagram of an exemplary method 600 for managing content, in accordance with various aspects of the present invention, is provided. Method 600 begins (step 602) with, for example, the utilization of a first computing node (or device).

A rendering of a first (or primary) content portion by the first computing node is detected (step 604). The first computing node may include a computing device, such as a smart television, mobile electronic device, desktop computer, etc. The rendering of the first content portion may include displaying at least some of the first content portion on a display device of the computing device. The first content portion may include, for example, video and/or audio content, images, reading materials, websites, etc.

A second (or secondary) content portion is received (or detected), which is associated with the first content portion (step 606). The second content portion may include at least some information that is included in the first content portion. For example, the first content portion may include a video (e.g., a commercial), and the second content portion may include information that is included within the video (e.g., contact information).

A second computing node is selected based on at least one of a location of the second computing node, an activity of an individual, and the second content portion (step 608). The selecting of the second computing node may include selecting the second computing node from a plurality of computing nodes associated with the individual. The selecting of the second computing node may be performed utilizing a cognitive analysis. If the selecting of the second computing node is based on at least the activity of the individual, the activity of the individual may include at least one of a current activity of the individual during the receiving of the second content portion or a previous activity of the individual associated with previous content portions. The second computing node may include a computing device that is of a different type than the first computing node. For example, the first computing node may include a general stationary computing device, such as a smart television or s desktop computer, and the second computing node may include a mobile electronic device, such as a mobile phone, laptop computer, tablet device, etc.

The second content portion is caused to be rendered by the second computing node (step 610). For example, if the second content portion includes contact information, the second computing node may include a computing device that is suitable for contacting the appropriate person, organization, etc. via the contact information (e.g., a telephone number is sent to/rendered by a mobile phone, an email address is sent to/rendered by a tablet device or laptop computer, etc.).

Method 600 ends (step 612) with, for example, the completion of the rendering of the second content portion on the second computing node. The process may be repeated for subsequent content portions and/or may be performed with respect to multiple secondary content portions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method, by one or more processors, for managing content comprising:
   detecting a rendering of a first content portion by a first computing node;
   receiving a second content portion, wherein the second content portion is associated with the first content portion;
   determining a gaze of an individual associated with the first computing node;
   responsive to determining the gaze of the individual is directed to the first content portion on the first computing node, selecting a second computing node based on a proximity of the second computing node relative to the individual as compared to a proximity of the first computing node relative to the individual, an activity of the individual, and the second content portion notwithstanding whether the second computing node is directly connected to the first computing node, wherein selecting the second computing node based on the second content portion includes contextually determining that certain material presented within the second content portion is more suited to be utilized by the second computing node rather than the first computing node; and
   causing the second content portion to be rendered by the second computing node.

2. The method of claim 1, wherein the selecting of the second computing node includes selecting the second computing node from a plurality of computing nodes associated with the individual.

3. The method of claim 1, wherein the selecting of the second computing node is performed utilizing a cognitive analysis.

4. The method of claim 1, wherein the selecting of the second computing node is based on at least the activity of the individual, wherein the activity of the individual includes at least one of a current activity of the individual during the receiving of the second content portion or a previous activity of the individual associated with previous content portions.

5. The method of claim 1, wherein the first content portion includes information, and wherein the second content portion includes at least some of the information.

6. The method of claim 1, wherein the first computing node includes a first type of computing device, and the second computing node includes a second type of computing device, the second type of computing device being different than the first type of computing device.

7. The method of claim 6, wherein the second computing node includes a mobile electronic device.

8. A system for managing content comprising:
   at least one processor that
      detects a rendering of a first content portion by a first computing node;
      receives a second content portion, wherein the second content portion is associated with the first content portion;
      determines a gaze of an individual associated with the first computing node;
      responsive to determining the gaze of the individual is directed to the first content portion on the first computing node, ceases a rendering of the second content portion by the first computing node and selects a second computing node based on a proximity of the second computing node relative to the individual as compared to a proximity of the first computing node relative to the individual, an activity of the individual, and the second content portion notwithstanding whether the second computing node is directly connected to the first computing node, wherein selecting the second computing node based on the second content portion includes contextually determining that certain material presented within the second content portion is more suited to be utilized by the second computing node rather than the first computing node; and
      causes the second content portion to be rendered by the second computing node.

9. The system of claim 8, wherein the selecting of the second computing node includes selecting the second computing node from a plurality of computing nodes associated with the individual.

10. The system of claim 8, wherein the selecting of the second computing node is performed utilizing a cognitive analysis.

11. The system of claim 8, wherein the selecting of the second computing node is based on at least the activity of the individual, wherein the activity of the individual includes at least one of a current activity of the individual during the receiving of the second content portion or a previous activity of the individual associated with previous content portions.

12. The system of claim 8, wherein the first content portion includes information, and wherein the second content portion includes at least some of the information.

13. The system of claim 8, wherein the first computing node includes a first type of computing device, and the second computing node includes a second type of computing device, the second type of computing device being different than the first type of computing device.

14. The system of claim 13, wherein the second computing node includes a mobile electronic device.

15. A computer program product for managing content by one or more processors, the computer program product comprising a non-transitory computer-readable storage medium having computer-readable program code portions stored therein, the computer-readable program code portions comprising:
   an executable portion that detects a rendering of a first content portion by a first computing node;
   an executable portion that receives a second content portion, wherein the second content portion is associated with the first content portion;
   an executable portion that determines a gaze of an individual associated with the first computing node;
   an executable portion that, responsive to determining the gaze of the individual is directed to the first content portion on the first computing node, ceases a rendering of the second content portion by the first computing node and selects a second computing node based on a proximity of the second computing node relative to the individual as compared to a proximity of the first computing node relative to the individual, an activity of the individual, and the second content portion notwithstanding whether the second computing node is directly connected to the first computing node, wherein selecting the second computing node based on the second content portion includes contextually determining that certain material presented within the second content portion is more suited to be utilized by the second computing node rather than the first computing node; and an executable portion that causes the second content portion to be rendered by the second computing node.

16. The computer program product of claim 15, wherein the selecting of the second computing node includes selecting the second computing node from a plurality of computing nodes associated with the individual.

17. The computer program product of claim 15, wherein the selecting of the second computing node is performed utilizing a cognitive analysis.

18. The computer program product of claim 15, wherein the selecting of the second computing node is based on at least the activity of the individual, wherein the activity of the individual includes at least one of a current activity of the individual during the receiving of the second content portion or a previous activity of the individual associated with previous content portions.

19. The computer program product of claim 15, wherein the first content portion includes information, and wherein the second content portion includes at least some of the information.

20. The computer program product of claim 15, wherein the first computing node includes a first type of computing device, and the second computing node includes a second type of computing device, the second type of computing device being different than the first type of computing device.

21. The computer program product of claim 20, wherein the second computing node includes a mobile electronic device.

* * * * *